United States Patent
O'Neill et al.

(10) Patent No.: US 8,847,776 B2
(45) Date of Patent: Sep. 30, 2014

(54) SYSTEM AND METHOD OF PROCESSING SENSOR INFORMATION

(75) Inventors: Conor O'Neill, Waterloo (CA); Conrad Kreek, Waterloo (CA); Jerry Mailloux, Waterloo (CA); Darcy Phipps, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1021 days.

(21) Appl. No.: 12/547,735

(22) Filed: Aug. 26, 2009

(65) Prior Publication Data

US 2011/0050437 A1    Mar. 3, 2011

(51) Int. Cl.
  G08B 21/00 (2006.01)
  H04M 1/04 (2006.01)
  H04M 1/725 (2006.01)

(52) U.S. Cl.
  CPC ............ H04M 1/04 (2013.01); H04M 1/72522 (2013.01); H04M 2250/12 (2013.01)
  USPC ......... 340/644; 340/679; 340/686.1; 340/501

(58) Field of Classification Search
  USPC ................. 340/568.1, 686.1, 686.4, 340/539.22–539.29; 702/189–195; 455/575.3
  See application file for complete search history.

(56) References Cited

U.S. PATENT DOCUMENTS

| | | | |
|---|---|---|---|
| 5,926,404 A * | 7/1999 | Zeller et al. | 713/321 |
| 6,674,358 B1 * | 1/2004 | Tinsley | 340/7.63 |
| 6,701,166 B2 * | 3/2004 | Lim | 455/575.3 |
| 6,836,212 B2 * | 12/2004 | Sawinski | 340/539.23 |
| 6,957,174 B2 * | 10/2005 | Wall | 702/189 |
| 7,076,267 B2 | 7/2006 | Vander Veen et al. | |
| 7,310,740 B2 * | 12/2007 | Price et al. | 713/320 |
| 8,121,810 B2 * | 2/2012 | Witte et al. | 702/150 |
| 2006/0022822 A1 * | 2/2006 | Wong et al. | 340/568.1 |
| 2006/0259166 A1 * | 11/2006 | Hoffman et al. | 700/80 |
| 2008/0012706 A1 | 1/2008 | Mak-Fan et al. | |
| 2008/0191905 A1 * | 8/2008 | Martin et al. | 341/24 |
| 2010/0223026 A1 * | 9/2010 | Witte et al. | 702/150 |

OTHER PUBLICATIONS

Xueqing Li, Sara—Canadian Intellectual Property Office, Examination Report for corresponding Canadian Patent Application No. 2,676,960, dated Sep. 24, 2012, Canada.
Ganssle, Jack, "My Favorite Software Debouncers", column from www.Embedded.com, Jun. 16, 2004, pp. 1-8.
Rosenthal, Scott, "A Project in the Field Must Adapt to Harsh Reality", article from www.SLTF.com, Feb. 1997, pp. 1-3.
MC Measurement Computing, "User's Guide", Sep. 6, 2009, pp. 1-41, document revision 6, Measurement Computing Corporation, USA.
Ganssle, Jack G., "A Guide to Debouncing", guide, Jun. 2008, pp. 1-22, revision 3.
Canadian Intellectual Property Office, Examination Report dated Dec. 6, 2013, issued on corresponding Canadian Patent Application No. 2,676,960.

* cited by examiner

Primary Examiner — Nabil Syed
Assistant Examiner — Brian Wilson
(74) Attorney, Agent, or Firm — Norton Rose Fulbright Canada LLP

(57) ABSTRACT

A system for processing sensor information in a wireless communications device, comprising a sensor processing module for execution by the microprocessor, the sensor processing module being configured to: receive a signal representing the state of the sensor; and process the received signal to determine whether there is a change in a state of the device; wherein processing the received signal includes implementation of a hysteresis.

18 Claims, 6 Drawing Sheets

SYSTEM AND METHOD OF PROCESSING SENSOR INFORMATION

TECHNICAL FIELD

The present disclosure relates generally to electronic devices, particularly wireless communications devices. In particular, the present disclosure relates to a system and method of processing sensor information in such devices.

BACKGROUND

Electronic devices often include sensors to detect a current state. For example, in the case of clamshell mobile devices, a sensor may detect whether the device is in an opened or closed state. Or in the case of portable devices having a holster, a sensor may detect whether the device is in or out of the holster.

The signals produced by such sensors often require processing, such as debouncing or noise filtering. These signals may be further processed according to each specific sensor. For example, in the case of a holster sensor, the sensor signal after being processing for debouncing may be further processed for events related to the holster.

It would be desirable to provide a method of efficiently processing such signals.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

In some aspects there is provided a system for processing sensor information in a wireless communications device, the system including: a microprocessor for controlling the operation of the device; a sensor for transmitting signals to the microprocessor indicative of a state of the sensor; and a memory coupled to the microprocessor; the memory having a sensor processing module for execution by the microprocessor, the sensor processing module being configured to: receive a signal representing the state of the sensor; and process the received signal to determine whether there is a change in a state of the device; wherein processing the received signal includes implementation of a hysteresis.

In some aspects, there is provided a method for processing sensor information in a wireless communications device, the device having a sensor having an associated state, the method including: receiving a signal representing the state of the sensor; processing the received signal to determine whether there is a change in a state of the device; and if there is a change in the state of the device, transmitting a signal representing the change of state; wherein processing the received signal includes implementation of a hysteresis.

In some aspects, there is provided a computer program product having a computer readable medium with computer executable instructions tangibly recorded thereon for processing sensor information in a wireless communications device, the device having a sensor having an associated state, the computer program product including: code for receiving a signal representing the state of the sensor; code for processing the received signal to determine whether there is a change in a state of the device; and code for transmitting a signal representing the change of state, if there is a change in the state of the device; wherein processing the received signal includes implementation of a hysteresis.

In the system, method and computer program product described above, implementation of the hysteresis may include: determining if the sensor has changed to an active state; if the sensor has changed to an active state, waiting for the expiry of a wait period; receiving a second signal representing a current state of the sensor after expiration of the wait period; determining if the sensor is still in the active state based on the second signal; and if the sensor is still in the active state, determining that there is a change in the state of the device.

Figure 1:
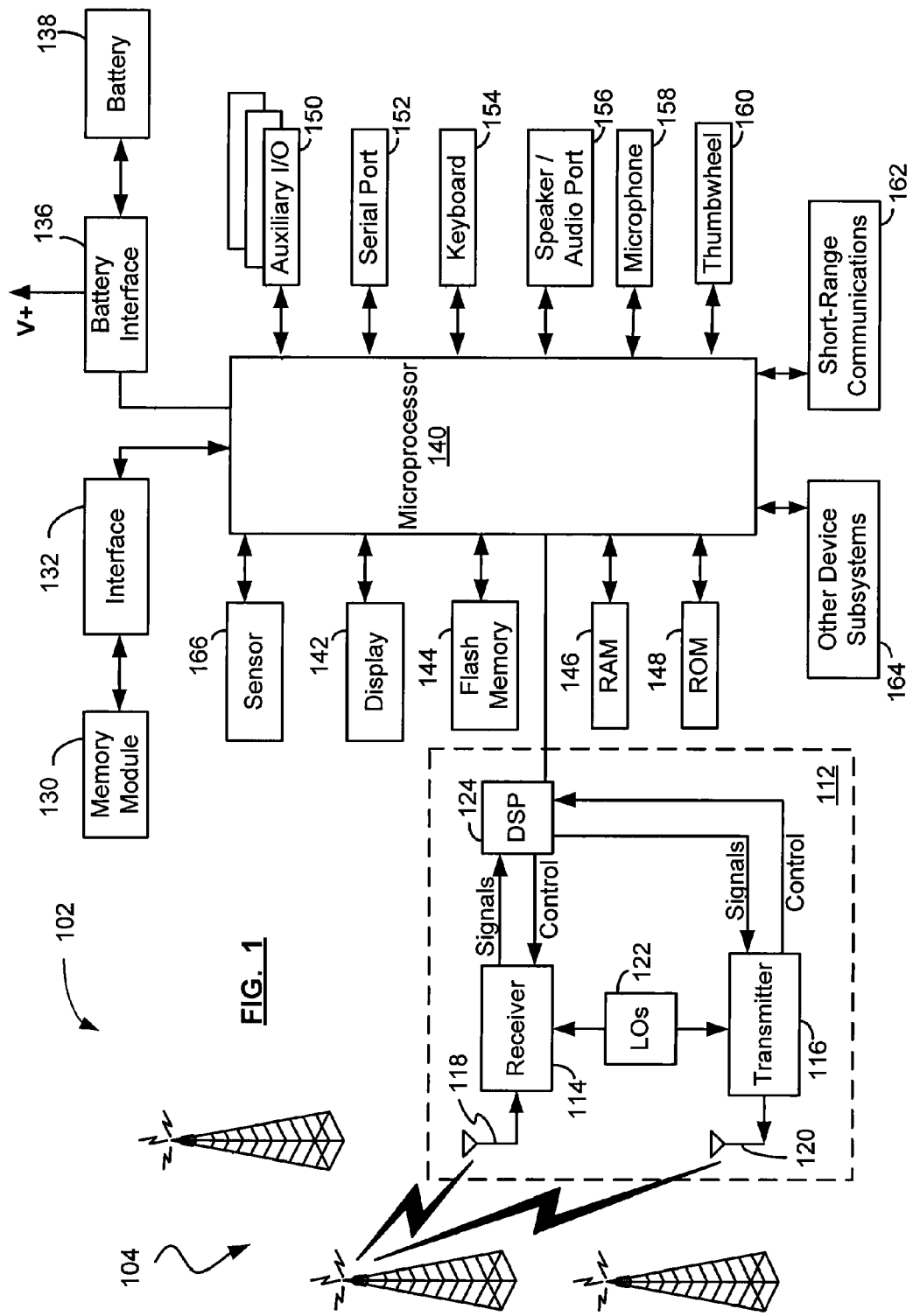
FIG. 1 shows in block diagram form an electronic device suitable for processing sensor information in accordance with an example embodiment.

Reference is first made to FIG. 1, which shows a block diagram illustrating an electronic device 102 suitable for processing sensor information in accordance with an example embodiment of the present disclosure. It will be understood that references to an electronic device in this disclosure may also refer to a portable or mobile device, such as a wireless communication device. Where the electronic device 102 is a wireless device, it may communicate through a wireless communication network 104. The wireless network 104 may include antennae, base stations, and supporting radio equipment for supporting wireless communications between the electronic device 102 and other devices connected to wireless network 104. The wireless network 104 may be coupled to a wireless network gateway and to a wide area network, shown in FIG. 2.

In an example embodiment, the electronic device 102 may be a two-way mobile communication device having at least voice and data communication capabilities, including the capability to communicate with other computer systems. Depending on the functionality provided by the electronic device 102, it may be referred to as a data messaging device, a two-way pager, a cellular telephone with data messaging capabilities, a wireless Internet appliance, a data communication device (with or without telephony capabilities), a clamshell device, or a flip-phone. The electronic device 102 may communicate with any one of a plurality of fixed transceiver stations within its geographic coverage area.

The electronic device 102 may incorporate a communication subsystem 112, which may include a receiver 114, a transmitter 116, and associated components, such as one or more antenna elements 118 and 120, local oscillators (LOs) 122, and a processing module such as a digital signal processor (DSP) 124. In an example embodiment, the antenna elements 118 and 120 may be embedded or internal to the electronic device 102. As will be apparent to those skilled in the field of communications, the particular design of the communication subsystem 112 may depend on the wireless network 104 in which the electronic device 102 is intended to operate.

The electronic device 102 may send and receive communication signals over the wireless network 104 after the required network registration or activation procedures have been completed. Signals received by the antenna 118 through the wireless network 104 may be input to the receiver 114, which may perform such common receiver functions as signal amplification, frequency down conversion, filtering, channel selection, etc., as well as analog-to-digital (A/D) conversion. A/D conversion of a received signal may allow more complex communication functions such as demodulation and decoding to be performed in the DSP 124. In a similar manner, signals to be transmitted may be processed, including modulation and encoding, for example, by the DSP 124. These DSP-processed signals may be input to the transmitter 116 for digital-to-analog (D/A) conversion, frequency up conversion, filtering, amplification, and transmission to the wireless network 104 via the antenna 120. The DSP 124 may not only process communication signals, but may also provide for receiver and transmitter control. For example, the gains applied to communication signals in the receiver 114 and the transmitter 116 may be adaptively controlled through automatic gain control algorithms implemented in the DSP 124.

Network access may be associated with a subscriber or user of the electronic device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of the electronic device 102 in order to operate in conjunction with the wireless network 104. Alternatively, the electronic device 102 may have an integrated identity module for use with systems such as Code Division Multiple Access (CDMA) systems.

The electronic device 102 also may include a battery interface 136 for receiving one or more rechargeable batteries 138. The battery 138 may provide electrical power to at least some of the electrical circuitry in the electronic device 102, and the battery interface 136 may provide a mechanical and electrical connection for the battery 138. The battery interface 136 may be coupled to a regulator (not shown) which may provide power V+ to the circuitry of the electronic device 102.

The electronic device 102 may include a microprocessor 140 which may control the overall operation of the electronic device 102. Communication functions, including at least data and voice communications, may be performed through the communication subsystem 112. The microprocessor 140 may also interact with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. The electronic device 102 may also include a sensor 166 for sensing a state of the electronic device 102, and the sensor 166 may also interact with the microprocessor 140. Some of the subsystems shown in FIG. 1 may perform communication-related functions, whereas other subsystems may provide "resident" or on-device functions. Notably, some subsystems, such as the keypad 154, the display 142, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 may be stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, may enable execution of software applications on the electronic device 102. A predetermined set of applications that control basic device operations, including data and voice communication applications, may be installed on the electronic device 102 during or after manufacture. The electronic device 102 may include a personal information manager (PIM) application having the ability to organize and manage data items relating to a user such as, but not limited to, instant messaging, email, calendar events, voice mails, appointments, and task items. One or more memory stores may be available on the electronic device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications may have the ability to send and receive data items via either the wireless network 104 or a link to a computer system. The link to the computer system may be via the serial port 152 or the short-range communications subsystem 162. In an example embodiment, PIM and/or media data items may be seamlessly combined, synchronized, and updated via the wireless network 104, with the electronic device user's corresponding data items stored and/or associated with a host computer system thereby creating a mirrored or partially mirrored host computer on the electronic device 102 with respect to such items. This may be useful where the host computer system is the electronic device user's office computer system. Additional applications may also be loaded onto the electronic device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the electronic device 102 and may provide enhanced on-device functions, communication-related functions, or both. For example, secure communication applications may enable electronic commerce functions and other such financial transactions to be performed using the electronic device 102.

In a data communication mode, a received data signal representing information such as a text message, an email message, a media file to be transferred, or Web page download may be processed by the communication subsystem 112 and input to the microprocessor 140. The microprocessor 140 may further process the signal for output to the display 142, or alternatively to the auxiliary I/O device 150. A user of the electronic device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the electronic device 102 may be similar, except that the received signals may be output to the speaker or audio port 156 and signals for transmission may be generated by a transducer such as the microphone 158. Alternative voice or audio I/O subsystems, such as a voice message recording subsystem, may also be implemented on the electronic device 102. Although voice or audio signal output is typically accomplished primarily through the speaker or audio port 156, the display 142 may also be used to provide an indication of the identity of a calling party, duration of a voice call, or other voice call related information. Stereo headphones or an earpiece may also be used in place of the speaker 156.

The serial port 152 may be implemented in a personal digital assistant (PDA) type communication device for which synchronization with a user's computer may be a useful, albeit optional, component. The serial port 152 may enable a user to set preferences through an external device or software application and may extend the capabilities of the electronic device 102 by providing for information or software downloads to the electronic device 102 other than through the wireless network 104. The alternate download path may, for example, be used to load software or data files onto the electronic device 102 through a direct, reliable and trusted connection.

The short-range communications subsystem 162 may be an additional optional component which may provide for communication between the electronic device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, the short-range communications subsystem 162 may be a wireless networking communications subsystem, conforming to IEEE 802.11 standards such as one or more of 802.11b, 802.11g, or 802.11n.

Figure 2:
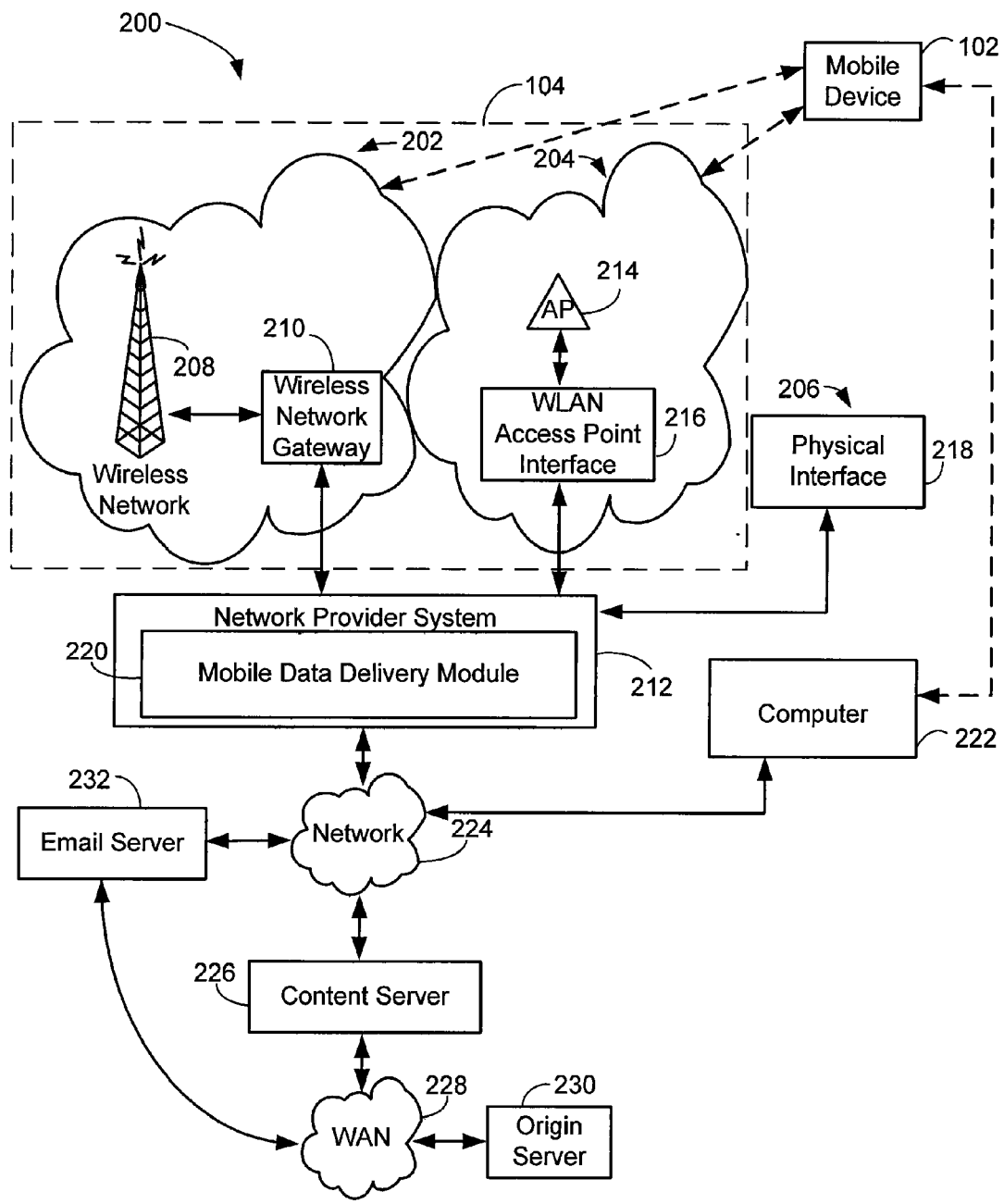
FIG. 2 shows in block diagram form a communication system suitable for providing the operating environment of the electronic device of FIG. 1 in accordance with an example embodiment.

Reference is next made to FIG. 2, which shows a communication system 200 suitable for use with the electronic device 102 shown in FIG. 1, for example where the electronic device 102 is a wireless device. The communication system 200 generally may include one or more electronic devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the electronic devices 102. The wireless WAN 202 may comprise a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 may also include a wireless network gateway 210 and one or more network provider systems 212. The wireless network gateway 210 may provide translation and routing services between the network provider system(s) 212 and the WAN 202, which may facilitate communication between the electronic devices 102 and other devices (not shown) connected, directly or indirectly, to the network provider system 212.

The WLAN 204 may comprise a network which in some examples may conform to IEEE 802.11 standards such as one or more of 802.11b, 802.11g, or 802.11n; however, other communications protocols may also be used for the WLAN 204. The WLAN 204 may include one or more wireless RF Access Points (AP) 214 (one of which is shown in FIG. 2) that collectively provide a WLAN coverage area. For the example embodiment depicted in FIG. 2, the WLAN 204 may be operated by an enterprise (for example, a business or university in a building or campus type environment) and the access points 214 may be connected to an access point (AP) interface 216. The AP interface 216 may provide translation and routing services between the access points 214 and the network provider system 212 to facilitate communication between two or more of the electronic devices 102 and other devices (e.g., such as desktop computers) connected, directly or indirectly, to the network provider system 212. The AP interface 216 may be implemented using a computer, for example, a server running a suitable computer program or software.

According to an example embodiment, the other interfaces 206 may be implemented using a physical interface indicated by reference 218. The physical interface 218 may include an Ethernet, Universal Serial Bus (USB), Firewire, or infrared (IR) connection implemented to exchange information between the network provider system 212 and the electronic device 102.

The network provider system 212 may comprise a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 may provide access for the electronic devices 102, through either the wireless WAN 202, the WLAN 204, or the other connection 206 to the devices connected, for example, through an enterprise network 224 (e.g., an intranet), to the network provider system 212. In an example embodiment, the data delivery module 220 may be implemented on a computer, such as the network provider system 212.

The enterprise network 224 may comprise a local area network, an intranet, the Internet, a direct connection, or combinations thereof. The enterprise network 224 may comprise an intranet for a corporation or other type of organization. In at least some example embodiments, the network provider system 212 may be part of the enterprise network 224, and may be located behind a corporate firewall and connected to the wireless network gateway 210 through the Internet. A computer 222 (e.g., a desktop or laptop computer) belonging to the user of the electronic device 102 may be connected to the enterprise network 224. As described earlier, the electronic device 102 may be temporarily and directly connected to the computer 222 using, for example, the serial port 152. Alternatively, the electronic device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some example embodiments, an email server 232 and/or the content server 226 may form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an example embodiment, the mobile data delivery module 220 may provide connectivity between the wireless WAN 202 and the WLAN 204 and the other connection 206 and devices and/or networks connected directly or indirectly to the network provider system 212. In an example embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, may be individually and/or collectively in various combinations a content source for the network provider system 212. It will be appreciated that the system shown in FIG. 2 may comprise but one possible communication network or configuration of a multitude of possible configurations for use with the electronic devices 102.

Figure 3A:
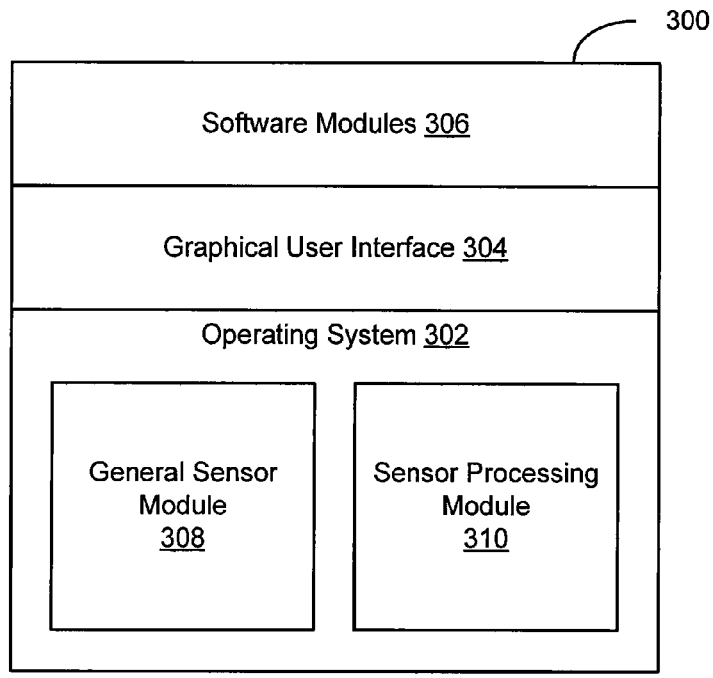
FIG. 3A shows in block diagram form the contents of a memory of the electronic device of FIG. 1.

Reference is next made to FIG. 3A, which shows a block diagram illustrating a memory 300 of the electronic device 102. The memory 300 may have various software components for controlling the electronic device 102 and may include, for example, the flash memory 144, the RAM 146, the ROM 148, the memory module 130 and/or the other device subsystems 164. To provide a user-friendly environment to control the operation of the electronic device 102, an operating system (OS) 302 resident on the electronic device 102 may provide a basic set of operations for supporting various applications typically operable through a primary user interface such as a graphical user interface (GUI) 304.

The OS may comprise a general sensor module 308 for transmitting signals representing a change of state. The general sensor module 308 may transmit these signals to affected modules and/or components of the wireless device 102 that may act on a change of state. The affected modules and/or components may register callback functions with the general sensor module 308, and the general sensor module 308 may transmit signals representing relevant changes of state to the appropriate registered modules and/or components. This registration may occur during system initialization, for example when the wireless device 102 is first turned on. In an example embodiment, there is a plurality of sensors 166 and a plurality of callback functions, each callback function associated with a specific change of state with respect to one of the sensors, the general sensor module 308 may determine the specific change of state that has occurred and transmit signals only to the appropriate associated callback function. The general sensor module 308 may also store the current state of the sensor 166. The OS may also comprise a sensor processing module 310, which may perform general signal processing on signals received from the sensor 166. The operating system 302 may provide basic input/output system features to obtain input from the auxiliary I/O 150, the keypad 154, the clickable thumbwheel 160, and other input devices, and to facilitate output to the user via at the display 142. The GUI 304 may be a component of the OS 302. One or more software modules 306 for processing communications or providing a personal digital assistant (PDA) or other functions may also be included.

The memory 300 may also include an email and calendar client, which may be combined in, for example, a PIM application having email-based calendaring and scheduling functions. Typically, the PIM may be installed as one of the software modules 306. The general sensor module 308 and the sensor processing module 310 may be included among the software modules 306. Thus, the electronic device 102 may include computer executable programmed instructions for directing the electronic device 102 to implement various applications. The programmed instructions may be tangibly embodied in the one or more software modules 306 resident in the memory 300 of the electronic device 102. Alternatively, the programmed instructions may be tangibly recorded on a computer readable medium (such as a DVD, CD, floppy disk or other storage media) which may be used for transporting the programmed instructions to the memory 300 of the electronic device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the electronic device 102 from, for example, the wireless network 104 by end users.

Although the sensor 166 may transmit signals indicating the state of the electronic device 102, such signals may also contain noise or transitory fluctuations which may result in false triggers that indicate a change of state. For example, where the sensor 166 is a magnetic sensor, radio frequency (RF) interference may cause the sensor 166 to produce transitory false triggers. In another example, where the sensor 166 is a mechanical sensor, there may be physical bouncing or rapid switching before the sensor settles on a new state. One way to address this problem is by processing signals from the sensor 166 to filter out such false triggers, for example using a debouncing algorithm. Such algorithms and other similar filters or variations would be known to persons skilled in the art. Other such general processing may be carried out on the signal. There may be a hysteresis or a delay of a predetermined amount of time, for example a 0.5 s delay, such that other modules and/or components of the wireless device 102 are not notified of a change of state until after this delay.

Often, an electronic device 102 has a plurality of sensors 166 producing a plurality of signals, each of which may require the same general processing, such as debouncing, delay or noise filtering. It may be redundant to have such processing performed in separate modules for each sensor 166. Such redundancy may be an inefficient use of processing power and may result in tedious or time-wasting work for a software developer. Further, signals direct from the sensor 166 may not be in a form that is easily interpreted and/or manipulated by the modules and/or components affected by the sensor signals, which would require additional work on the part of the software developer when developing each module. The sensor processing module 310 and the general sensor module 306 may be useful in addressing these challenges by performing general processing of the signals and by relaying information on relevant changes of state to the affected modules and/or components.

Figure 3B:
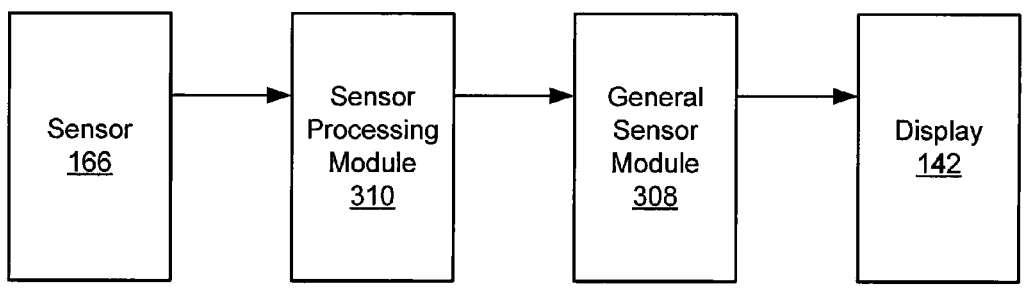
FIG. 3B illustrates an example of the processing of sensor information in accordance with an example embodiment.

Reference is now made to FIG. 3B, illustrating an example of how a change of state is communicated to a component. A raw signal representing a change in the sensor 166 is transmitted from the sensor 166 to the sensor processing module 310. The sensor processing module 310 may perform general processing on the raw signal, as described below. The processed signal, representing a change of state, may be transmitted from the sensor processing module 310 to the general sensor module 308. The general sensor module 308 may then execute any callback functions, for modules and/or components having registered callback functions with the general sensor module, relevant to the specific change of state, thus transmitting change of state information to the affected component, in this example the display 142.

Figure 4:
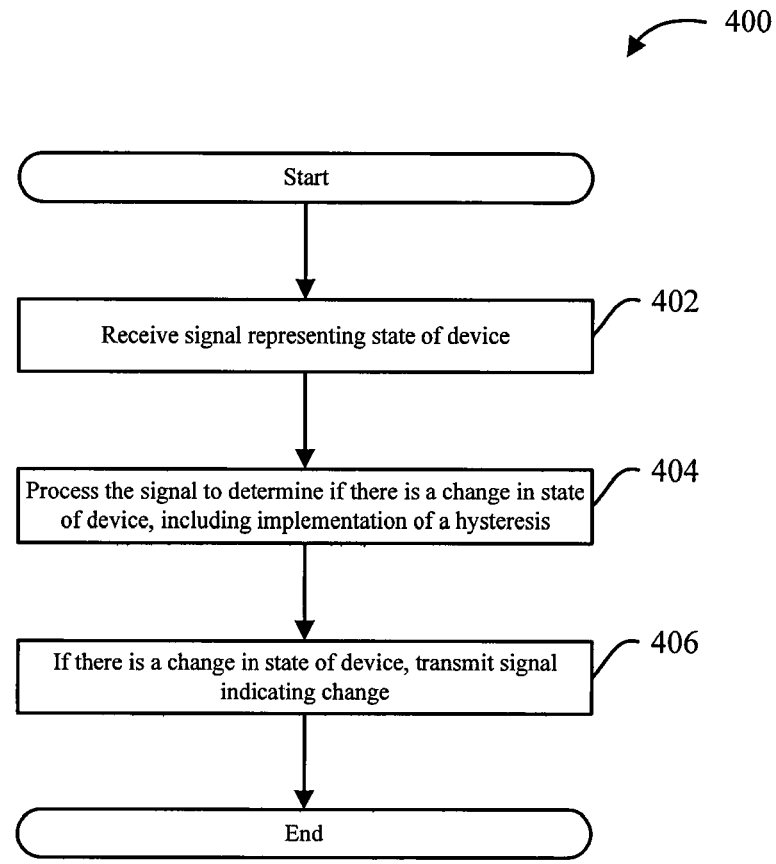
FIG. 4 is a flowchart illustrating a method of processing sensor information in accordance with an example embodiment.

Reference is now made to FIG. 4, which is a flowchart illustrating a general method 400 of processing sensor information, in accordance with an example embodiment. The method 400 may be carried out by the sensor processing module 310, and may apply to all sensors 166.

At 402, a signal representing a change in the sensor 166 is received. This signal may be transmitted from the sensor 166 to the sensor processing module 310.

At 404, the received signal is processed to determine whether there has been a change of state of the electronic device 102. This processing may include the implementation of a hysteresis or delay, which is described below. This processing may be performed by the sensor processing module 310. The processing may involve a debouncing algorithm.

The sensor processing module 310 may carry out a suitable debouncing algorithm as described below. This debouncing algorithm may help to filter out transitory fluctuations or noise such as RF interference, which would otherwise give rise to a false trigger. When the received signal has changed, the sensor processing module 310 may initiate a debounce timer. This timer may implement a predetermined wait time that is suitable to filter out transitory fluctuations, for example 20 ms. After the debounce timer expires, a signal indicative of the state of the electronic device 102 is again received from the sensor 166. The wait time may be repeated, for a predetermined amount of time, and the signal received again. For example, the sensor processing module 310 could receive samples of the signal in this manner for a total of five times. If any one of the signals received during this debouncing algorithm indicates another change of state, then the received signal is considered to have transitory fluctuations, the sample count is reset, and these false triggers are ignored. The received signal samples must consecutively indicate a consistent state, in this example for a total of five samples, for the sensor processing module 310 to determine that a change of state has indeed occurred, as opposed to a transitory fluctuation.

The processing described above may filter out transitory fluctuations in signals from the sensor, for example fluctuations in a magnetic sensor due to RF interference or other noise. The time and sample parameters described above may be suitable for filtering out such RF interference since the wait time of 20 ms per sample and the total time of 100 ms for five samples may be much longer than the time duration of typical RF interference. The debouncing algorithm described above may use timers with different wait periods, and may require a different number of consistent samples, depending on the type of fluctuation to be filtered out, the sensitivity of the sensor, and/or the degree of accuracy desired. These parameters may be predetermined before processing of the signal, such as preset at the time of manufacture.

The sensor processing module 310 may implement a hysteresis or delay. A component may register a wait period or delay for a sensor 166 with the sensor processing module 310. This registration may be similar to registration of a callback function, and in some cases the wait period may be thought of as a type of callback function that when executed implements a delay. The wait period registered may represent an amount of time that the sensor processing module 310 allows to elapse before re-sampling a signal from the sensor 166. Only if the re-sampled signal still indicates the same state as before the wait period, is the change of state confirmed. Only then is the processed signal transmitted to the general sensor module 308. Thus, the hysteresis or delay implemented by the sensor processing module 310 may ensure that a new state (e.g., as indicated by a change of state signal) persists at least as long as the wait period before the affected components and/or modules are notified of the change of state.

In some example embodiments, this wait period may only apply when the sensor 166 changes to its "active" state. The "active" state may be defined differently according to the specific sensor 166. For example, for a holster sensor, the "in-holster" state may be considered the "active" state, while for a flip sensor, a "flip closed" state may be considered the "active" state.

This may be useful, for example, for a flip phone or clamshell device, where flipping close the device may trigger an interior screen to turn off. However, the user may rapidly flip close and reopen the device. In such a case, it would be a waste of processing power to turn off the screen only to turn it back on in rapid succession. The hysteresis or delay provided by the sensor processing module 310 helps avoid this waste.

The sensor processing module 310 processes signals from all sensors 166 where there is a plurality of sensors 166, and may apply different debouncing algorithms and/or hysteresis for signals received from different sensors 166. Different parameters for the debouncing algorithm and/or hysteresis may be set by the sensors 166 themselves (e.g., during initialization when device 102 is first turned on) or may be set by the sensor processing module 310.

At 406, if a change of state is determined, a signal representing a change of state is transmitted. For example, the signal representing a change of state may be transmitted from the sensor processing module 310 to the general sensor module 308. A callback function appropriate to the change of state may be executed by the general sensor module. The callback function may be registered with the general sensor module 308 by a module or component that is affected by the change of state. The appropriate callback function to execute may be determined by the general sensor module 308, for example based on the sensor 166 from which the change of state signal was originally received. This may apply where there is a plurality of different sensors 166. Where the general sensor module 308 stores the current state of the sensor 166, the stored state may be updated.

By executing the appropriate callback function, the general sensor module 308 may transmit a signal to the appropriate components and/or modules that a relevant change of state has occurred. For example, where the change of state affects the function of the display 142, the signal may be transmitted to any component controlling the display 142. The signal may simply indicate that a change of state has occurred, or the signal may provide information about which state the electronic device 102 has changed to. Thus, the general sensor module 308 may provide a general common interface for all other components and/or modules for accessing change of state information, without the other components and/or modules being required to process signals from or otherwise be concerned with the workings of any specific sensor 166.

One example is described here, wherein both a debouncing algorithm and a hysteresis or delay are implemented by the sensor processing module 310. In this example, there may be a plurality of sensors 166. At initialization of each sensor 166, debouncing and hysteresis parameters are set at the sensor processing module 310. For example, parameters such as numberDebounceChecks (i.e., number of times to check the state of a sensor 166 when implementing a debouncing algorithm); debounceInterval (i.e., amount of time to wait between each debounce check); and activeDelay (i.e., wait period before the sensor processing module 310 sends a signal to the general sensor module 308 to indicate a sensor change to an "active" state). The sensor processing module 310 may also be provided with a pointer to a function for each sensor 166, is SensorActive, that returns whether a certain sensor 166 is in the "active" state. When a sensor 166 changes state, the sensor processing module 310 receives a signal indicating this change, and implements the debouncing algorithm, for example by calling is SensorActive in intervals of debounceInterval for numberDebounceChecks times. If, after this algorithm, the sensor processing module 310 determines that the sensor 166 has maintained a stable state, the sensor processing module 310 will send a signal to the general sensor module 308 to inform of this state change, where there is no hysteresis to be implemented (e.g., the sensor 166 changed state to an "inactive" state). If a hysteresis is to be implemented (e.g., the sensor 166 changed state to an "active" state), then the sensor processing module 310 may wait for a time period of activeDelay to expire, then again call is SensorActive to determine if the sensor 166 is still in the "active" state, and only if the "active" state has been maintained is a signal sent to the general sensor module 308 to inform of this change of state. Where there is a plurality of sensors 166, each sensor 166 may have its own set of these parameters for debouncing and/or hysteresis. Each sensor 166 may also have its own is SensorActive function to be called by the sensor processing module 310.

While the method 400 has been described as implementing a debouncing algorithm and a hysteresis or delay, persons skilled in the art would understand that other general signal processing algorithms may be carried out by the sensor processing module 310. For example, the sensor processing module 310 may perform other noise filtering or may implement other delays. In general, such processing by the sensor processing module 310 filter out transitory noise or transitory changes of state. The general sensor module 308 may provide a registration mechanism for other modules and/or components, such as the display 142, to register callback functions to be executed when there is a change of state, as described above.

Figure 5A:
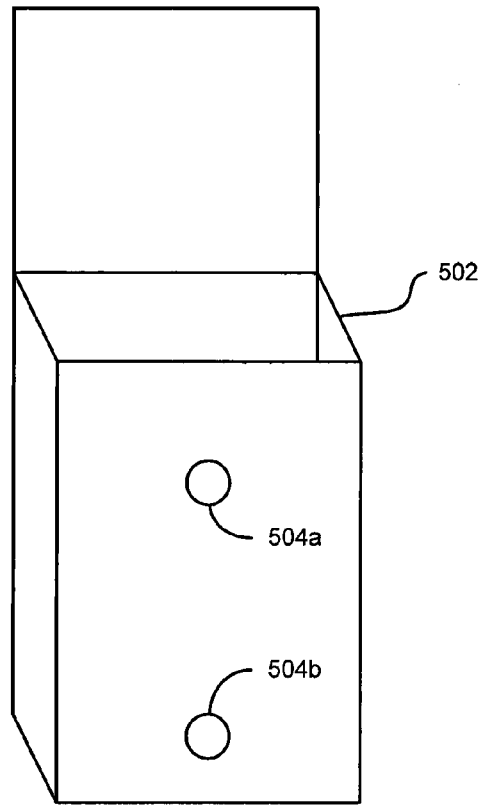
FIGS. 5A and 5B show schematically an electronic device having a holster sensor in accordance with an example embodiment.
Figure 5B:
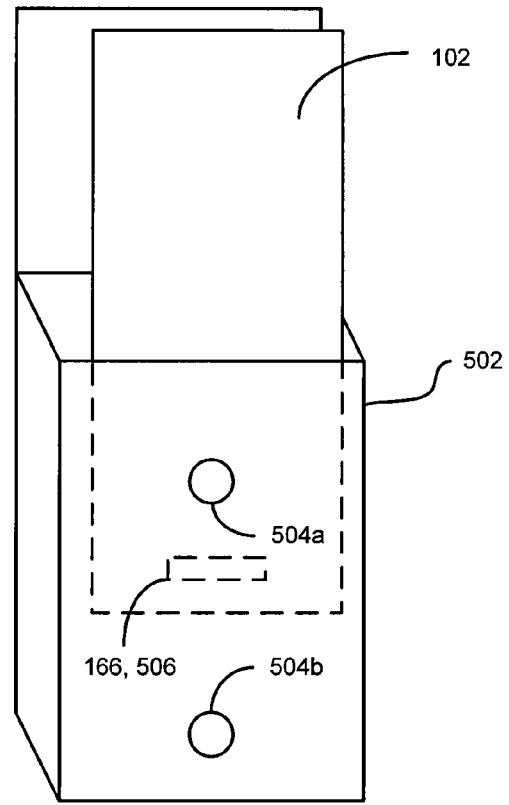

Reference is now made to FIGS. 5A and 5B, which schematically illustrate a holster and a device having a holster sensor to which a system and method of processing sensor information may be applied, in accordance with an example embodiment.

In FIG. 5A, the holster 502 is shown when the electronic device 102 has been removed. In FIG. 5B, the electronic device 102 is shown partly inserted into the holster 502. The holster 502 has a first magnet 504a and a second magnet 504b. The first magnet 504a may be positioned so as to enable the cover of the holster 502 to be magnetically secured when closed. The second magnet 504b may be positioned so as to trigger the sensor 166, which in this example is a holster sensor 506, on the electronic device 102. The holster sensor 506 may be a magnetic sensor, such that the presence of a magnet such as the first or second magnet 504a, 504b, may be sensed by the holster sensor 506. In the example embodiment shown, the presence of a magnet, as sensed by the holster sensor 506, is used to determine whether or not the electronic device 102 is in the holster 502. When the electronic device 102 is in the holster 502, the electronic device 102 may be considered to have an "in-holster" state. The electronic device 102 may carry out one or more events specific to the "in-holster" state, such as entering a sleep mode. When the electronic device 102 is out of the holster 502, the electronic device 102 may be considered to have an "out-of-holster" state. The electronic device 102 may carry out one or more events specific to the "out-of-holster" state, such as exiting the sleep mode.

When the holster sensor 506 does not sense the presence of a magnet, the holster sensor 506 may transmit a signal indicating that the state of the holster sensor 506 is in the "out-of-holster" state. When the holster sensor 506 senses the presence of a magnet, the holster sensor 506 may transmit a signal indicating that the state of the holster sensor 506 is in the "in-holster" state. The signal from the holster sensor 506 may include transitory noise, for example from radio frequency (RF) interference, which may falsely indicate a transitory change of state. The signal from the holster sensor 506 may also exhibit transitory fluctuations when changing from a signal indicative of the "in-holster" state to one indicative of the "out-of-holster" state or vice versa, resulting in false indications of transitory changes of state. Such false transitory signals may be filtered out by the sensor processing module 310 as described above. In some example embodiments, additional processing and/or filtering may be performed, using algorithms in the sensor processing module 310 or using callback functions from the specialized sensor module 310, to completely filter out a false trigger.

The presence of the first magnet 504a may also cause the holster sensor 506 to generate a false trigger. As seen in FIG. 5B, when the electronic device 102 is inserted into the holster 502, the holster sensor 506 first passes the first magnet 504a before the electronic device 102 is fully inserted, at which point the holster sensor 506 is positioned at the second magnet 504b. As such, the holster sensor 506 will first sense the presence of the first magnet 504a and transmit a signal representing the "in-holster" state. When the electronic device 102 is further inserted into the holster 502, the holster sensor 506 reaches a position between the first magnet 504a and the second magnet 504b, as shown in the figure. At this point, the holster sensor 506 does not sense either the first magnet 504a or the second magnet 504b and transmits a signal representing the "out-of-holster" state. When the electronic device 102 is fully inserted into the holster 502, the holster sensor 506 senses the presence of the second magnet 504b and transmits a signal representing the "in-holster" state. The "out-of-holster" signal that is sent when the holster sensor 506 is positioned in between the two magnets 504a, 504b is a false trigger. However, this may be a false trigger that is specific to the holster sensor 506 and may not be filtered out by the sensor processing module 310.

Figure 6:
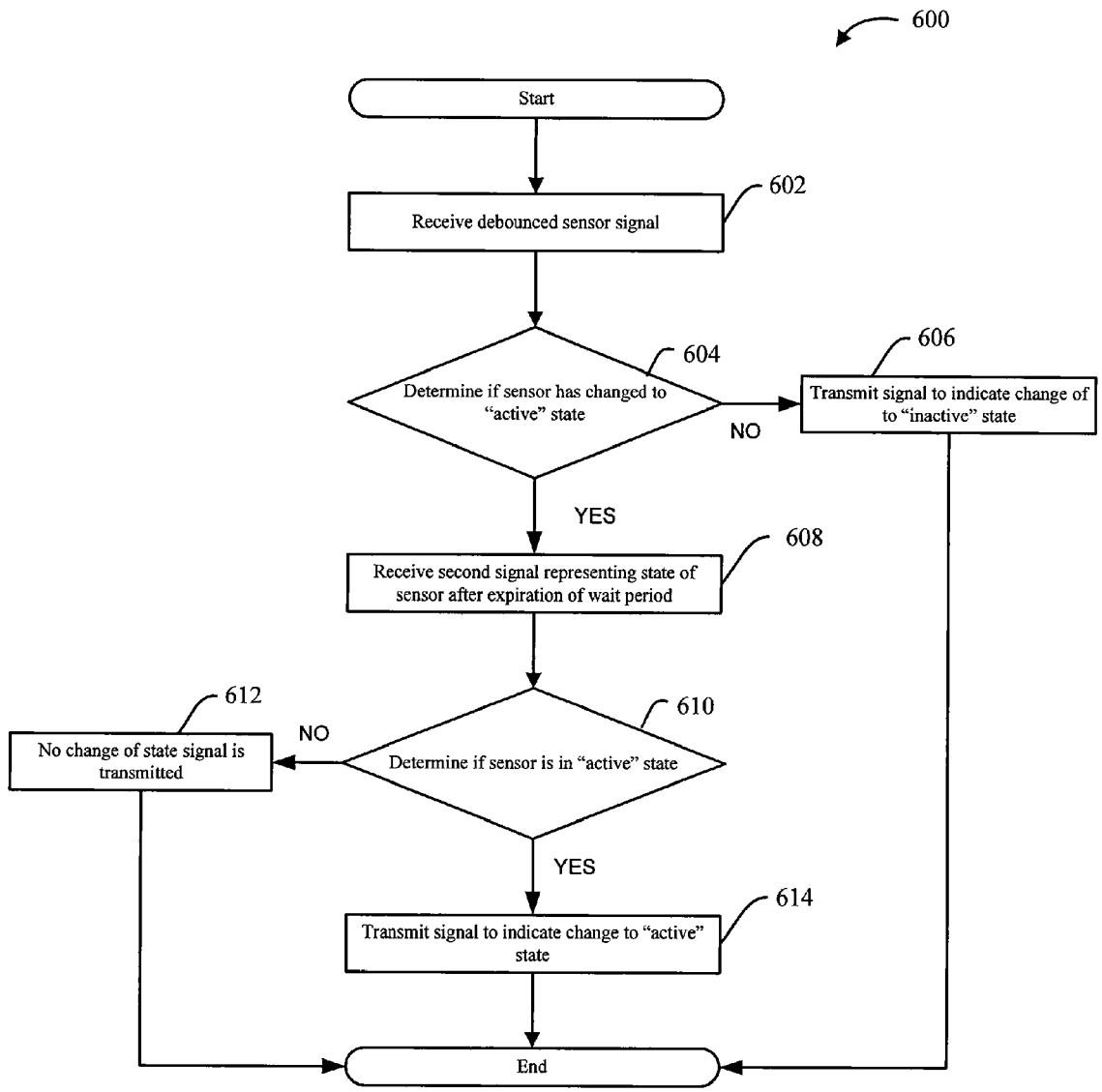
FIG. 6 is a flowchart illustrating a method of processing sensor information for a holster sensor in accordance with an example embodiment.

Reference is now made to FIG. 6, which is a flowchart illustrating a general method 600 of processing sensor information, in accordance with an example embodiment. The method 600 illustrates an example of an implementation of a hysteresis. The method 600 may generally be carried out as part of the method 400, for example as part of step 404. The method 600 may be performed by the sensor processing module 310. The method 600 may be specific to a certain sensor 166, such as the holster sensor 506, and may be varied for other sensors 166.

At 602, the debounced signal is received. Alternatively or in addition, other processing may have been carried out on the raw signal from the sensor. This may be performed by the sensor processing module 310. In some examples, the method 600 may be carried out without any prior processing of the raw signal.

At 604, it is determined whether the sensor 166 has changed to an "active" state. The "active" state may be defined depending on the specific sensor 166. For example, for the holster sensor 506, the "active" state may be defined as the "in-holster" state. For a flip sensor, the "active" state may be defined as the "flipped closed" state. This determination may be based on information contained in the initial signal from the sensor 166 (e.g., the initial signal may indicate that the state has changed to "active"), or may be based on historical information (e.g., the initial signal may simply indicate that the change of state in the sensor has occurred, and historical information is used to determined whether the previous state was "inactive"). For example, where the general sensor module 308 stores the current state of the sensor 166, this determination may be based on an update to the stored current state, as described above.

If the sensor 166 has not changed to "active" state, then the change is to the "inactive" state and the method 600 proceeds to 606. At 606, a signal indicating the change to the "inactive" state is transmitted. This signal may be transmitted from the sensor processing module 310 to the general sensor module 308, which may in turn execute the appropriate callback function to transmit this information to the affected modules and/or components. The method 600 ends.

At 608, if the sensor 166 has changed to the "active" state, a second signal representing the state of the sensor 166 is received after the expiration of a predetermined wait period. This second signal may be received by the sensor processing module 310 from the sensor 166. The sensor processing module 310 may process the second signal, for example by debouncing, as described above. The wait period may be preset at the time of manufacture and may be specific to each sensor 166. For example, for the holster sensor 506, the wait period may be designed to accommodate insertion of the electronic device 102 into the holster 502 having two magnets 504a, 504b, taking into account the average time for a user to insert the electronic device 102 into the holster 502. For example, the wait period may be about 0.5 s in duration for a signal from the holster sensor 506. For a signal from a flip sensor, for example, the wait period may be about 1s in duration. Other wait periods may be preset for other sensors 166 as appropriate.

At 610, it is determined whether the sensor 166 is still in the "active" state. This determination may be carried out by the sensor processing module 310 based on the second signal, for example by evaluating whether the second signal represents an "active" or an "inactive" state.

If the second signal does not indicate an "active" state, then the change of state is considered a false trigger and the method 600 proceeds to 612. At 612, no change of state signal is transmitted and the method 600 ends.

At 614, if the second signal does represent an "active" state, then a signal indicating a change to the "active" state is transmitted. This signal may be transmitted from the sensor processing module 310 to the general sensor module 308, which may in turn execute any appropriate callback function, as described above. The method 600 ends.

While the method 600 has been described as being carried out in the sensor processing module 310 and the holster sensor 506 has been shown as an example, a person skilled in the art would understand that the method 600 may be applicable to processing sensor signals for any sensors known to be vulnerable to similar false triggers. It may be useful to apply the hysteresis or delay only to a change to the "active" state, such that there is no wait period when a change to the "inactive" state is determined. This may be useful to the user, for example in the case of a holster sensor 506, such that there is no delay in turning on the display 142 when the electronic device 102 is removed from the holster. Similarly, this may be useful in the case of a flip sensor, such that the user does not experience a delay in turning on the display 142 when the electronic device 102 is flipped open.

Although a holster sensor module for the holster sensor 506 is described, the present disclosure may also be used for other specialized sensor modules for other sensors. For example, where the electronic device 102 is a clamshell device, the electronic device 102 may include a flip sensor that senses whether the electronic device 102 is opened or closed, and a flip sensor module having callback functions for processing signals from the flip sensor using algorithms specific to the flip sensor. Similarly, the electronic device 102 may include an orientation sensor, such as an accelerometer, and an orientation sensor module. Other such sensors and specialized sensor modules may be included, as would be understood by a person skilled in the art. The sensor processing module 310 may implement a hysteresis or delay for some or all such sensors, and the wait period implemented may be the same for all sensors, or may be specific for each sensor, as described above.

While the steps of the methods 400 and 600 are shown as occurring in a particular order, it will be appreciated by those skilled in the art that many of the steps are interchangeable and may occur in different orders than that shown without materially affecting the end results of the methods 400 and 600. Similarly, although method 600 is described as occurring within method 400, it will be appreciated by those skilled in the art that method 600 may occur elsewhere within method 400, and may occur independent of method 400. Additionally, while the method 400 and the method 600 have been described with regards to the general sensor module 308 and sensor processing module 310, it will be understood by those skilled in the art that a module or modules structured similar to the general sensor module 308 and/or the sensor processing module 310 may be implemented as part of the other software modules on the electronic device.

While the present disclosure refers to a the use of a clickable thumbwheel 160, a keyboard 154, an input device, or similar navigation and input mechanisms for navigation on an electronic device 102, it will be appreciated by those skilled in the art that navigation, input or both may be provided by the use of a touchscreen display. The display 142 may be a touchscreen display. Navigation or input on a touchscreen display may be by contacting the display directly with fingers, or by using a stylus or a similar pointing device.

While the present disclosure includes description of a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions tangibly recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The example embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

The invention claimed is:

1. A system for processing sensor information in a wireless communications device, comprising:
 a processor; and
 a plurality of sensors, each sensor configured to transmit signals to the processor indicative of a state of the sensor;
 wherein the processor is configured to implement a sensor processing module and a general sensor module;
 the sensor processing module configured, for each of the plurality of sensors, to:
 receive the transmitted signals indicative of the state of the respective sensor; and
 process the received signals, to determine whether there is a change in a state of the wireless communication device, and if so transmit a first signal representing the change in the state of the wireless communication device; and
 the general sensor module configured to:
 accept registration of at least one callback function made by at least one affected component of the wireless communication device having a function that is affected by the change in the state of the wireless communication device, wherein the at least one affected component registers the at least one callback function during initialization of the system;
 receive the first signal from the sensor processing module; and
 after receiving the first signal, execute the at least one callback function by transmitting a second signal representing the change in the state of the wireless communication device to the at least one affected component.

2. The system of claim 1 wherein the sensor processing module is configured to process the received signals by:
 applying a debouncing algorithm to the received signals.

3. The system of claim 1 wherein the sensor processing module is configured to process the received signals, for at least one of the plurality of sensors, by implementing a hysteresis comprising:
 determining if the one of the plurality of sensors has changed to an active state;
 if the one of the plurality of sensors has changed to an active state, waiting for the expiry of a wait period;
 receiving a further transmitted signal indicative of a current state of the one of the plurality of sensors after expiration of the wait period;
 determining if the one of the plurality of sensors is still in the active state based on the further received signal; and
 if the one of the plurality of sensors is still in the active state, determining that there is a the change in the state of the wireless communication device.

4. The system of claim 1 wherein for each of the at least one affected components having registered the at least one callback function with the general sensor module, and each callback function being associated with a corresponding specific change in the state of the wireless communication device, the general sensor module is further configured to:
 determine the corresponding specific change in the state of the wireless communication device; and
 execute the callback function for that affected component, if the callback function is associated with the corresponding specific change in the state of the wireless communication device.

5. The system of claim 1 wherein one of the plurality of sensors is a holster sensor, and wherein the transmitted signal is indicative of whether the wireless communication device is in a holster.

6. The system of claim 1 wherein one of the plurality of sensors is a flip sensor, and wherein the transmitted signal is indicative of whether the wireless communication device is flipped closed.

7. A method for processing sensor information in a wireless communications device, the wireless communication device having a plurality of sensors, each sensor having an associated state, comprising:
 at a sensor processing module implemented by a processor of the wireless communications device:
 receiving a signal representing the respective associated state of one of the plurality of sensors; and
 processing the received signal, to determine whether there is a change in a state of the wireless communication device, and if so transmit a first signal representing the change in the state of the wireless communication device; and
 at a general sensor module implemented by the processor:
 accepting registration of a at least one callback function made by at least one affected component of the wireless communication device having a function that is affected by the change in the state of the wireless communication devices, wherein the at least one affected component registers the at least one callback function during initialization of the wireless communication device;
 receiving the first signal from the sensor processing module; and
 after receiving the first signal, executing the at least one callback function by transmitting a second signal representing the change in the state of the wireless communication device to the at least one affected component.

8. The method of claim 7 wherein the processing of the received signal comprises:
 at the sensor processing module, applying a debouncing algorithm to the received signal.

9. The method of claim 7 wherein the processing of the received signal, for at least one of the plurality of sensors, comprises implementation of a hysteresis by:
 determining if the one of the plurality of sensors has changed to an active state;
 if the one of the plurality of sensors has changed to the active state, waiting for the expiration of a wait period;
 receiving a further signal representing a current state of the one of the plurality of sensors after expiration of the wait period;
 determining if the one of the plurality of sensors is still in the active state based on the further received signal; and if the one of the plurality of sensors is still in the active state, determining that there is the change in the state of the wireless communication device.

10. The method of claim 7 wherein the method further comprises, for each the at least one affected components having registered the at least one callback function with the general sensor module, and each registered callback function being associated with a corresponding specific change in the state of the wireless communication device:
   determining the corresponding specific change in the state of the wireless communication device; and
   executing the callback function for that affected component, if the callback function is associated with the corresponding specific change in the state of the wireless communication device.

11. The method of claim 7 wherein one of the plurality of sensors is a holster sensor, and wherein the received signal is indicative of whether the wireless communication device is in a holster.

12. The method of claim 7 wherein one of the plurality of sensors is a flip sensor, and wherein the received signal is indicative of whether the wireless communication device is flipped closed.

13. A computer program product having a non-transitory computer readable medium with computer executable instructions tangibly recorded thereon for processing sensor information in a wireless communications device, the wireless communication device having a plurality of sensors, each sensor having an associated state, and the computer executable instructions comprising:
   code for, at a sensor processing module implemented by a processor of the wireless communications device:
      receiving a signal representing the respective associated state of one of the plurality of sensors; and
      processing the received signal, to determine whether there is a change in a state of the wireless communication device, and if so transmit a first signal representing the change in the state of the wireless communication device; and
   code for, at a general sensor module implemented by the processor:
      accepting registration of at least one callback function made by at least one affected component of the wireless communication device having a function that is affected by the change in the state of the wireless communication device, wherein the at least one affected component registers the at least one callback function during initialization of the wireless communication device;
      receiving the first signal from the sensor processing module; and
      after receiving the first signal, executing the at least one callback function by transmitting a second signal representing the change in the state of the wireless communication device to the at least one affected component.

14. The computer program product of claim 13 wherein the code for processing the received signal comprises:
   code for, at the sensor processing module, applying a debouncing algorithm to the received signal.

15. The computer program product of claim 13 wherein the code for processing the received signal comprises, for at least one of the plurality of sensors, code for implementation of a hysteresis comprising:
   code for determining if one of the plurality of sensors has changed to an active state;
   code for waiting for the expiration of a wait period, if the one of the plurality of sensors has changed to the active state;
   code for receiving a further signal representing a current state of the one of the plurality of sensors after expiration of the wait period;
   code for determining if the one of the plurality of sensors is still in the active state based on the further received signal; and
   code for determining that there is the change in the state of the wireless communication device, if the one of the plurality of sensors is still in the active state.

16. The computer program product of claim 13 wherein the computer program product further comprises, for each of the at least one affected components having registered the at least one callback function with the general sensor module, and each registered callback function being associated with a corresponding specific change in the state of the wireless communication device:
   code for determining the corresponding specific change in the state of the wireless communication device; and
   code for executing the callback function for that affected component, if the callback function is associated with the corresponding specific change in the state of the wireless communication device.

17. The computer program product of claim 13 wherein one of the plurality of sensors is a holster sensor, and wherein the received signal is indicative of whether the wireless communication device is in a holster.

18. The computer program product of claim 13 wherein one of the plurality of sensors is a flip sensor, and wherein the received signal is indicative of whether the wireless communication device is flipped closed.

* * * * *